US012712810B2

(12) United States Patent
Eckert

(10) Patent No.: US 12,712,810 B2
(45) Date of Patent: Aug. 18, 2026

(54) RECURSIVE BITSTRING STRUCTURE ADDRESSING

(71) Applicant: HUAWEI TECHNOLOGIES CO., LTD., Shenzhen (CN)

(72) Inventor: Toerless Tobias Eckert, Addison, TX (US)

(73) Assignee: Huawei Technologies Co., Ltd., Shenzhen (CN)

( * ) Notice: Subject to any disclaimer, the term of this patent is extended or adjusted under 35 U.S.C. 154(b) by 285 days.

(21) Appl. No.: 18/654,549

(22) Filed: May 3, 2024

(65) Prior Publication Data

US 2024/0283740 A1 Aug. 22, 2024

Related U.S. Application Data

(63) Continuation of application No. PCT/US2022/049017, filed on Nov. 4, 2022.

(Continued)

(51) Int. Cl.
*H04L 45/74* (2022.01)
*H04L 12/18* (2006.01)
*H04L 15/16* (2006.01)

(52) U.S. Cl.
CPC .............. *H04L 45/74* (2013.01); *H04L 12/18* (2013.01); *H04L 15/16* (2013.01)

(58) Field of Classification Search
CPC .......... H04L 45/74; H04L 12/18; H04L 45/16
See application file for complete search history.

(56) References Cited

U.S. PATENT DOCUMENTS

2002/0080755 A1* 6/2002 Tasman .................. H04L 45/52 370/338
2015/0085635 A1* 3/2015 Wijnands ............... H04L 45/12 370/216

(Continued)

FOREIGN PATENT DOCUMENTS

WO WO-2019205806 A1 * 10/2019 ......... H04L 12/1881
WO WO-2022046207 A1 * 3/2022 ......... G06F 16/2291

OTHER PUBLICATIONS

Eckert, "Carrier Grade Minimalist Multicast (CGM2) using Bit Index Explicit Replication (BIER) with Recursive BitString Structure (RBS) Addresses," draft-eckert-bier-cgm2-rbs-00, Oct. 25, 2021, 27 pages.

(Continued)

*Primary Examiner* — Kyung H Shin
(74) *Attorney, Agent, or Firm* — Conley Rose, P.C.

(57) ABSTRACT

A multicast method performed by a network element includes receiving a packet that includes a payload and an addressing header with a recursive bitstring (RBS) structure. The RBS structure includes a recursive unit (RU) of the network element, comprising a forwarding bitstring field indicating one or more other network elements to which to forward the payload, and one or more additional RUs each comprising a forwarding bitstring field indicating how the other network elements should forward the payload. The RBS structure further includes one or more RU locating fields, indicating a location within the RU of the network element and the one or more additional RUs. The method further includes forwarding the packet according to the forwarding bitstring field in the RU of the network element, where the forwarded packet comprises rewritten RU locating fields indicating a location within the RU of an RU of a subsequent network element.

19 Claims, 10 Drawing Sheets

Related U.S. Application Data

(60) Provisional application No. 63/359,608, filed on Jul. 8, 2022, provisional application No. 63/276,484, filed on Nov. 5, 2021.

(56) References Cited

U.S. PATENT DOCUMENTS

2018/0091424 A1* 3/2018 Jalil ........................ H04L 45/30
2020/0145325 A1* 5/2020 LaVigne ............... H04L 47/125

OTHER PUBLICATIONS

Eckert, Ed., et al., "Tree Engineering for Bit Index Explicit Replication (BIER-TE)," draft-ietf-bier-te-arch-10, Jul. 9, 2021, 68 pages.

Wijnands, IJ., Ed., Rosen, E., Ed., Dolganow, A., Przygienda, T., and S. Aldrin, "Multicast Using Bit Index Explicit Replication (BIER)", RFC 8279, DOI 10.17487/RFC8279, Nov. 2017, <https://www.rfc-editor.org/info/rfc8279>.43 pages.

T. Eckert: "Carrier Grade Minimalist Multicast (CGM2) using Bit Index Explicit Replication (BIER) with Recursive BitString Structure (RBS) Addresses," draft-eckert-bier-cgm2-rbs-00, Oct. 25, 2021, total 19 pages.

* cited by examiner

Figures 8C, 8D, 8E:
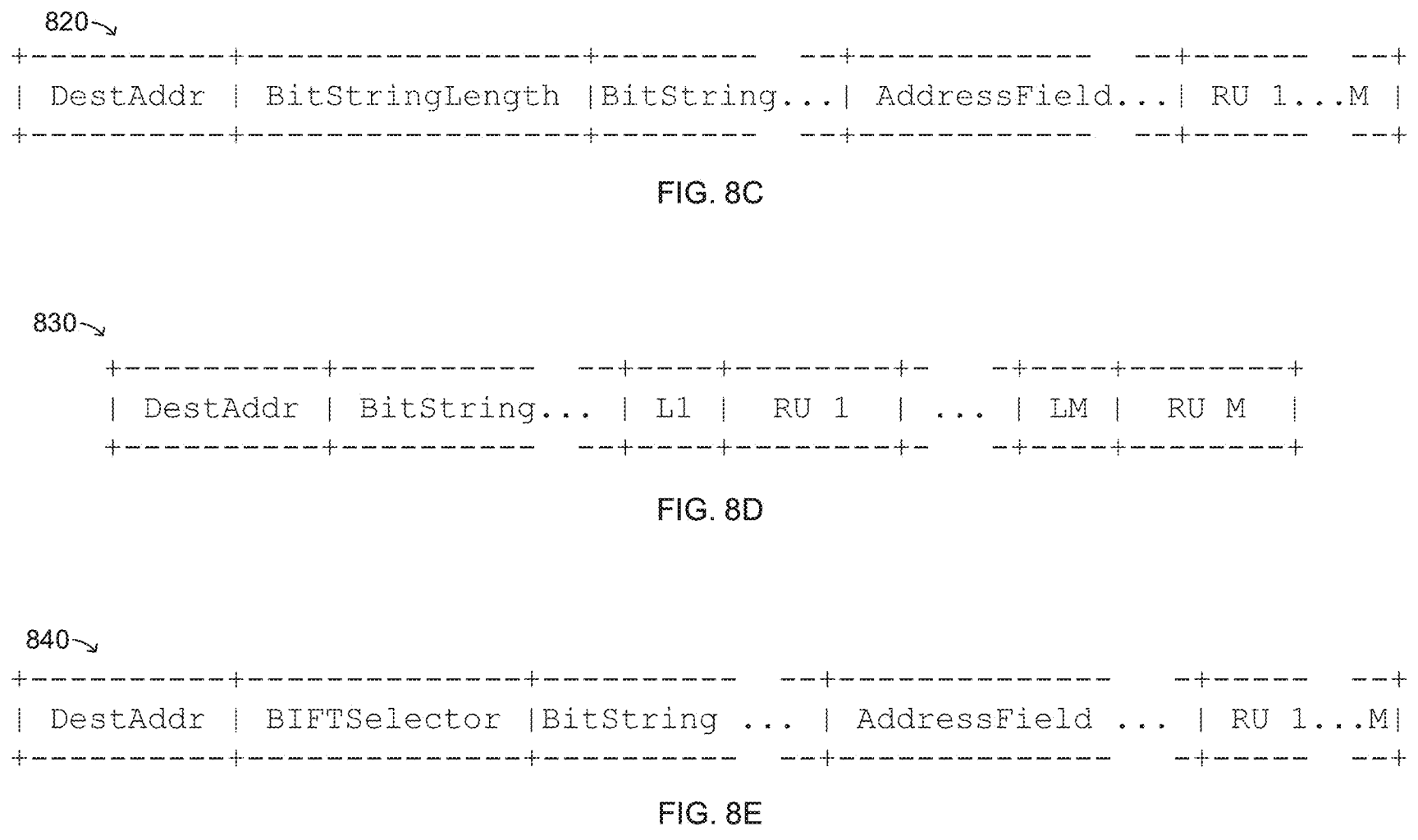

820

```
+----------+-----------------+---------   --+------------   --+------   --+
| DestAddr | BitStringLength |BitString...| AddressField...| RU 1...M |
+----------+-----------------+---------   --+------------   --+------   --+
```

```
+----------+----------   --+----+--------+-    -+----+--------+
| DestAddr | BitString... | L1 |  RU 1  | ... | LM |  RU M  |
+----------+----------   --+----+--------+-    -+----+--------+
```

```
+----------+-------------+---------   --+-------------   -+-----   --+
| DestAddr | BIFTSelector |BitString ... | AddressField ... | RU 1...M|
+----------+-------------+---------   --+-------------   -+-----   --+
```

Figures 9A, 9B:
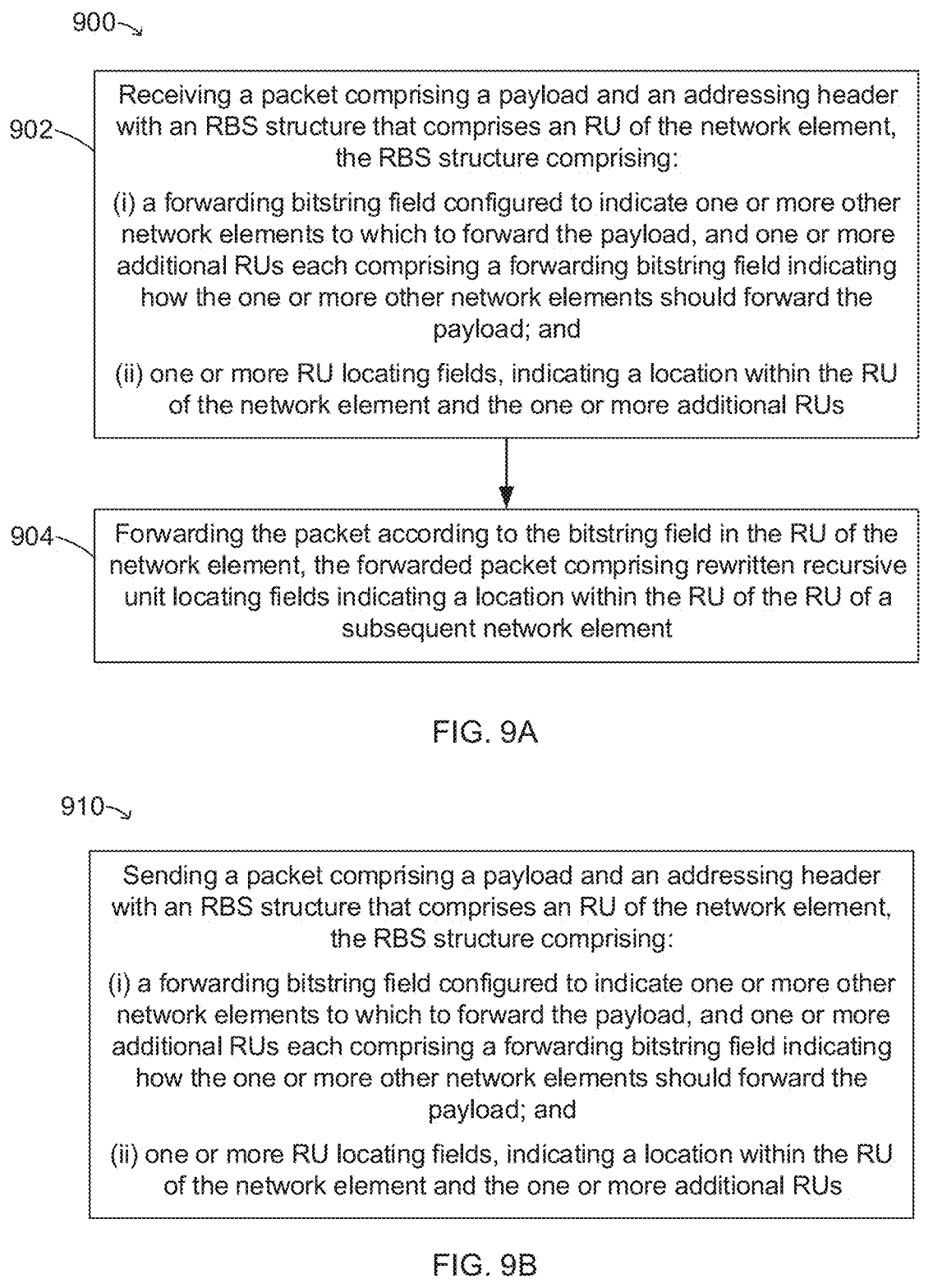

902 Receiving a packet comprising a payload and an addressing header with an RBS structure that comprises an RU of the network element, the RBS structure comprising:

(i) a forwarding bitstring field configured to indicate one or more other network elements to which to forward the payload, and one or more additional RUs each comprising a forwarding bitstring field indicating how the one or more other network elements should forward the payload; and (ii) one or more RU locating fields, indicating a location within the RU of the network element and the one or more additional RUs 904 Forwarding the packet according to the bitstring field in the RU of the network element, the forwarded packet comprising rewritten recursive unit locating fields indicating a location within the RU of the RU of a subsequent network element

Sending a packet comprising a payload and an addressing header with an RBS structure that comprises an RU of the network element, the RBS structure comprising:

(i) a forwarding bitstring field configured to indicate one or more other network elements to which to forward the payload, and one or more additional RUs each comprising a forwarding bitstring field indicating how the one or more other network elements should forward the payload; and (ii) one or more RU locating fields, indicating a location within the RU of the network element and the one or more additional RUs

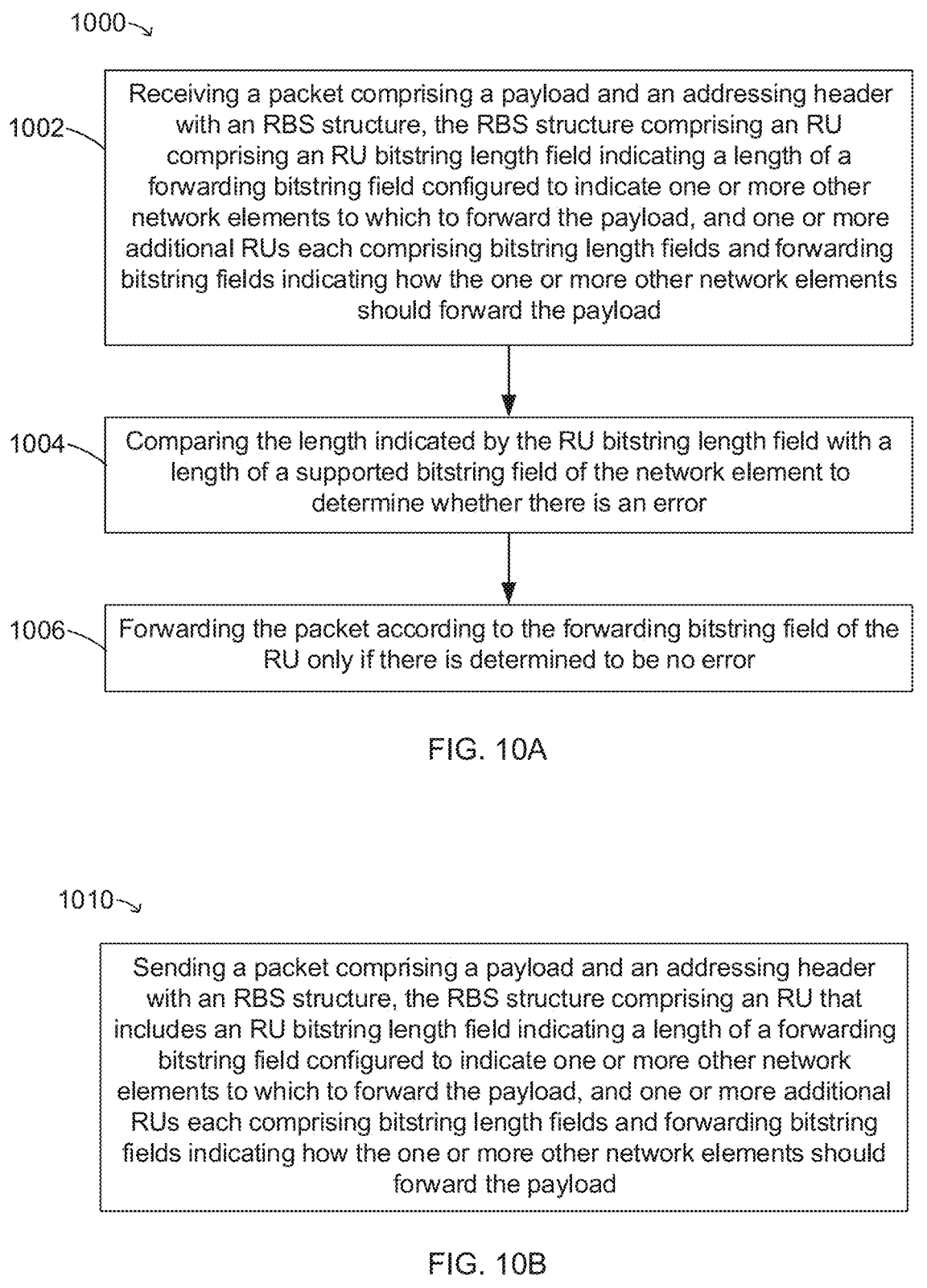

1002 Receiving a packet comprising a payload and an addressing header with an RBS structure, the RBS structure comprising an RU comprising an RU bitstring length field indicating a length of a forwarding bitstring field configured to indicate one or more other network elements to which to forward the payload, and one or more additional RUs each comprising bitstring length fields and forwarding bitstring fields indicating how the one or more other network elements should forward the payload 1004 Comparing the length indicated by the RU bitstring length field with a length of a supported bitstring field of the network element to determine whether there is an error 1006 Forwarding the packet according to the forwarding bitstring field of the RU only if there is determined to be no error

Sending a packet comprising a payload and an addressing header with an RBS structure, the RBS structure comprising an RU that includes an RU bitstring length field indicating a length of a forwarding bitstring field configured to indicate one or more other network elements to which to forward the payload, and one or more additional RUs each comprising bitstring length fields and forwarding bitstring fields indicating how the one or more other network elements should forward the payload

FIG. 10B

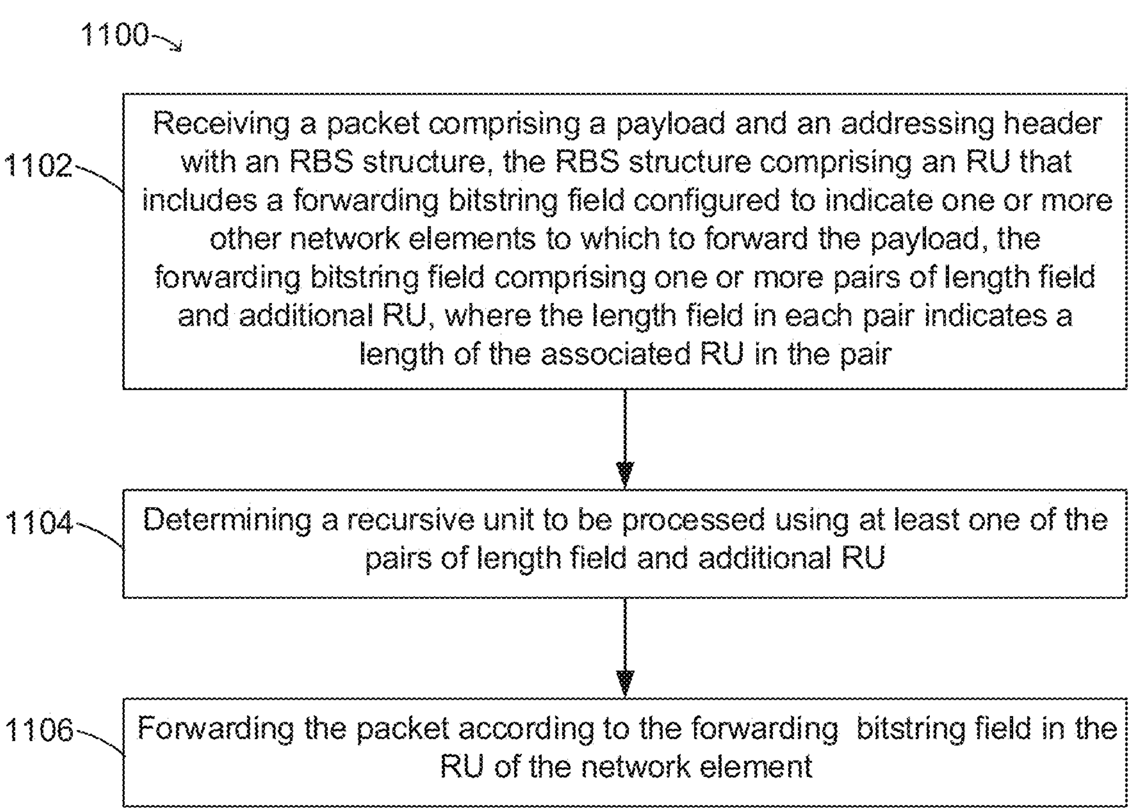

Sending a packet comprising a payload and an addressing header with an RBS structure, the RBS structure comprising an RU that includes a forwarding bitstring field configured to indicate one or more other network elements to which to forward the payload, the forwarding bitstring field comprising one or more pairs of length field and additional RU, where the length field in each pair indicates a length of the associated RU in the pair

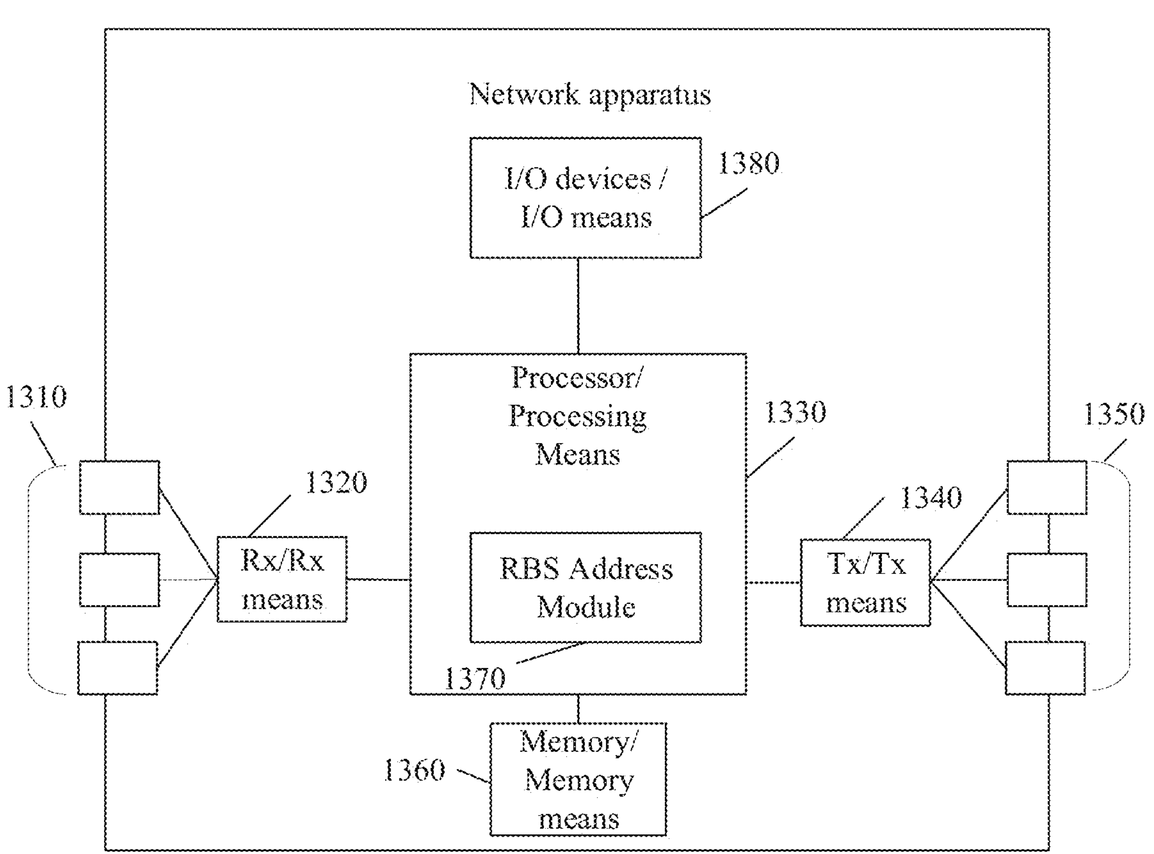
FIG. 13

RECURSIVE BITSTRING STRUCTURE ADDRESSING

CROSS-REFERENCE TO RELATED APPLICATIONS

This application is a continuation of International Application No. PCT/US2022/049017 filed on Nov. 4, 2022, by Futurewei Technologies, Inc., and titled "Recursive Bit-String Structure Addressing," which claims the benefit of (i) U.S. Provisional Patent Application No. 63/359,608 filed Jul. 8, 2022 by Futurewei Technologies, Inc., and titled "Performance and Reliability optimizations for Recursive BitString Structure Addresses and their forwarding processing" and (ii) U.S. Provisional Patent Application No. 63/276,484 filed Nov. 5, 2021 by Futurewei Technologies, Inc., and titled "Performance and Reliability optimizations for Recursive BitString Structure Addresses and their forwarding processing." All three above-referenced applications are incorporated herein by reference.

TECHNICAL FIELD

The present disclosure is generally related to the field of network communication and, in particular, to optimizations for performance and reliability of Recursive BitString Structure (RBS) addresses and their forwarding processing.

BACKGROUND

Bit Index Explicit Replication (BIER) mechanisms provide optimized forwarding of multicast data packets through a BIER domain. BIER domains may not require the use of a protocol for explicitly building multicast distribution trees. Further, BIER domains may not require intermediate nodes to maintain any per-flow state. BIER is described in further detail in Internet Engineering Task Force (IETF) document Request for Comments (RFC) 8279 entitled "Multicast Using Bit Index Explicit Replication (BIER)" by I. J. Wijnands, et al., published November 2017, which is hereby incorporated by reference.

Traffic Engineering (TE) is the process of steering traffic across a telecommunications network to facilitate efficient use of available bandwidth between a pair of routers. BIER Traffic/Tree Engineering (BIER-TE) is described in IETF document "Tree Engineering for Bit Index Explicit Replication (BIER-TE)" by T. Eckert, et al., published Jul. 9, 2021, which is hereby incorporated by reference.

Carrier Grade Minimalist Multicast (CGM2) replaces the in-packet-header delivery tree of BIER-TE packets with a hierarchical structure of BFR-local BitStrings called the Recursive BitString Structure (RBS) Address, as described in IETF document "Carrier Grade Minimalist Multicast (CGM2) using Bit Index Explicit Replication (BIER) with Recursive BitString Structure (RBS) Addresses" by T. Eckert, published Oct. 25, 2021, which is hereby incorporated by reference.

SUMMARY

The disclosed aspects/embodiments provide techniques that allow a network element to send and forward packets comprising a payload and an addressing header that includes an improved RBS structure. Such improved RBS structures provide for optimized performance and reliability in such network elements' forwarding processing. Using the improved RBS structures, packet routing within networks comprising such network elements is improved relative to existing techniques.

A first aspect relates to a multicast method performed by a network element, the method comprising: receiving a packet, the packet comprising a payload and an addressing header with a recursive bitstring (RBS) structure, the RBS structure comprising: a recursive unit (RU) of the network element, comprising a forwarding bitstring field configured to indicate one or more other network elements to which to forward the payload, and one or more additional RUs each comprising a forwarding bitstring field indicating how the one or more other network elements should forward the payload; and one or more RU locating fields, indicating a location within the RU of the network element and the one or more additional RUs; and forwarding the packet according to the forwarding bitstring field in the RU of the network element, the forwarded packet comprising rewritten RU locating fields indicating a location within the RU of an RU of a subsequent network element.

A second aspect relates to a multicast method performed by a network element, the method comprising: sending a packet, the packet comprising a payload and an addressing header with a recursive bitstring (RBS) structure, the RBS structure comprising: a recursive unit (RU) of the network element, comprising a forwarding bitstring field configured to indicate one or more other network elements to which to forward the payload, and one or more additional RUs each comprising a forwarding bitstring field indicating how the one or more other network elements should forward the payload; and one or more RU locating fields, indicating a location within the RU of the network element and the one or more additional RUs.

Optionally, in any of the preceding aspects, another implementation of the aspect provides that the recursive unit locating fields comprise a recursive unit offset field.

Optionally, in any of the preceding aspects, another implementation of the aspect provides that the recursive unit locating fields comprise a recursive unit length field.

Optionally, in any of the preceding aspects, another implementation of the aspect provides that the forwarded packet comprises all of the recursive units included in the received packet.

A third aspect relates to a multicast method performed by a network element, the method comprising: receiving a packet, the packet comprising a payload and an addressing header with a recursive bitstring (RBS) structure, the RBS structure comprising: a recursive unit (RU) comprising a forwarding bitstring field configured to indicate one or more other network elements to which to forward the payload, an RU bitstring length field indicating a length of the forwarding bitstring field, and one or more additional RUs each comprising bitstring length fields and forwarding bitstring fields indicating how the one or more other network elements should forward the payload; comparing the length indicated by the RU bitstring length field with a length of a supported bitstring field of the network element to determine whether there is an error; and forwarding the packet according to the forwarding bitstring field of the RU only if there is determined to be no error.

Optionally, in any of the preceding aspects, another implementation of the aspect further provides that no further parsing of the packet is performed if there is determined to be an error.

Optionally, in any of the preceding aspects, another implementation of the aspect further provides that the length of the network element's supported bitstring fields corresponds to a size of a bitstring index forwarding table (BIFT) of the network element.

Optionally, in any of the preceding aspects, another implementation of the aspect further comprises sending an error message toward a source of the packet if there is determined to be an error.

A fourth aspect relates to a multicast method performed by a network element, the method comprising: sending a packet, the packet comprising a payload and an addressing header with a recursive bitstring (RBS) structure, the RBS structure comprising: a recursive unit (RU) comprising a forwarding bitstring field configured to indicate one or more other network elements to which to forward the payload, an RU bitstring length field indicating a length of the forwarding bitstring field, and one or more additional RUs each comprising bitstring length fields and forwarding bitstring fields indicating how the one or more other network elements should forward the payload.

Optionally, in any of the preceding aspects, another implementation of the aspect further provides that a length of the RU bitstring length field is a predetermined value A fifth aspect relates to a multicast method performed by a network element, the method comprising: receiving a packet, the packet comprising a payload and an addressing header with a recursive bitstring (RBS) structure, the RBS structure comprising: a recursive unit (RU) comprising a forwarding bitstring field configured to indicate one or more other network elements to which to forward the payload, the forwarding bitstring field comprising one or more pairs of length field and additional RU, where the length field in each pair indicates a length of the associated RU in the pair; determining an additional RU to be processed using at least one of the pairs of length field and additional RU; forwarding the packet according to the forwarding bitstring field in the RU of the network element.

A sixth aspect relates to a multicast method performed by a network element, the method comprising: sending a packet, the packet comprising a payload and an addressing header with a recursive bitstring (RBS) structure, the RBS structure comprising: a recursive unit (RU) comprising a forwarding bitstring field configured to indicate one or more other network elements to which to forward the payload, the forwarding bitstring field comprising one or more pairs of length field and additional RU, where the length field in each pair indicates a length of the associated RU in the pair.

Optionally, in any of the preceding aspects, another implementation of the aspect further provides that the packet comprises a length field corresponding to each additional RU.

Optionally, in any of the preceding aspects, another implementation of the aspect further provides that the length field and the additional RU of each pair are stored adjacent to each other in the packet.

A seventh aspect relates to a multicast method performed by a network element, the method comprising: receiving a packet, the packet comprising a payload and an addressing header with a recursive bitstring (RBS) structure, the RBS structure comprising: a recursive unit (RU) comprising a forwarding table selector field indicating a forwarding table to be used by the network element, a forwarding bitstring field indicating other network elements to which to forward the payload, and one or more additional RUs each comprising a forwarding bitstring field indicating how other network elements should forward the payload; and forwarding the packet according to the forwarding bitstring field in the RU of the network element and the forwarding table selector field, the forwarded packet comprising one of the one or more additional RUs.

An eighth aspect relates to a multicast method performed by a network element, the method comprising: sending a packet, the packet comprising a payload and an addressing header with a recursive bitstring (RBS) structure, the RBS structure comprising: a recursive unit (RU) comprising a forwarding table selector field indicating a forwarding table to be used by a receiving network element, a bitstring field indicating other network elements to which to forward the payload, and one or more additional recursive units each comprising a forwarding bitstring field indicating how other network elements should forward the payload.

Optionally, in any of the preceding aspects, another implementation of the aspect further provides that the forwarding table selector field is encoded with variable length encoding.

Optionally, in any of the preceding aspects, another implementation of the aspect further provides that the forwarding table selector field is encoded using only the values 0, 10, and 11.

Optionally, in any of the preceding aspects, another implementation of the aspect further provides that the forwarding bitstring field comprises a bitstring configured to address one of (i) vertices of a graph and (ii) leaf nodes and/or intermediate nodes of a distribution tree.

Optionally, in any of the preceding aspects, another implementation of the aspect further provides that the RBS structure further comprises a non-bitstring destination address.

A ninth aspect relates to a non-transitory computer readable medium comprising a computer program product for use by a network element, the computer program product comprising computer executable instructions stored on the non-transitory computer readable medium that, when executed by one or more processors, cause the network element to execute any of the preceding aspects.

A tenth aspect relates to a network element configured to perform the methods of any of the preceding aspects.

For the purpose of clarity, any one of the foregoing embodiments may be combined with any one or more of the other foregoing embodiments to create a new embodiment within the scope of the present disclosure.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIGS. 8A-8E are schematic diagrams of structured addresses and RUs according to embodiments of the disclosure.

FIGS. 9A-9B are first and second multicast methods performed by a network element for receiving and sending (respectively) a packet comprising a payload and an addressing header with an RBS structure.

FIGS. 10A-10B are third and fourth multicast methods performed by a network element for receiving and sending (respectively) a packet comprising a payload and an addressing header with an RBS structure.

FIGS. 11A-11B are fifth and sixth multicast methods performed by a network element for receiving and sending (respectively) a packet comprising a payload and an addressing header with an RBS structure.

FIGS. 12A-12B are seventh and eighth multicast methods performed by a network element for receiving and sending (respectively) a packet comprising a payload and an addressing header with an RBS structure.

FIG. 13 is a schematic diagram of a network element according to an embodiment of the disclosure.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Existing techniques provide a traffic-steering addressing mechanism using an RBS. Such mechanisms may be a BIER mechanism with an RBS in which a packet processing element (e.g., a router): a) examines a structured addressing field of a received packet; b) extracts an RU from the address structure; and c) creates a copy of the original packet in which a subset of the extracted RU replaces the RU of the originally received packet. A structured address (or structured addressing field) is a packet address field that has a defined structure, for example by an industry standard, but which can be modified while remaining compliant with the standard.

Disclosed herein are an RU offset field and an RU length field in a structured address that identify a portion of a received packet that indicates where the packet is to be forwarded on a next hop, enabling a forwarding node to modify only the RU offset field and the RU length field in the address structure of the received packet, rather than replacing the extracted RU with a subset of the extracted RU.

Also disclosed herein is an RU comprising a bit string length field that specifics a length of the bit string field in the RU, allowing the length of the bit string to be compared to a parameter of the forwarding node to detect an upstream error in the received packet.

Also disclosed herein is an RU comprising data structures pairing RUs with their associated length fields, allowing quicker traversing of the RU to access an RU of a next hop for forwarding a received packet.

Also disclosed herein is an RU comprising a forwarding table selector field indicating a local forwarding table to be used by a forwarding node in forwarding a received packet, allowing a reduction in length of the RU where a forwarding node has a large number of outgoing interfaces and a smaller number of patterns of forwarding messages to those interfaces.

Also disclosed herein is a method of combining a multicast destination address with a structured address or RU of other embodiments of the disclosure, to specify forwarding of packets in egress routers of a network.

Figures 1A, 1B, 1C, 2:
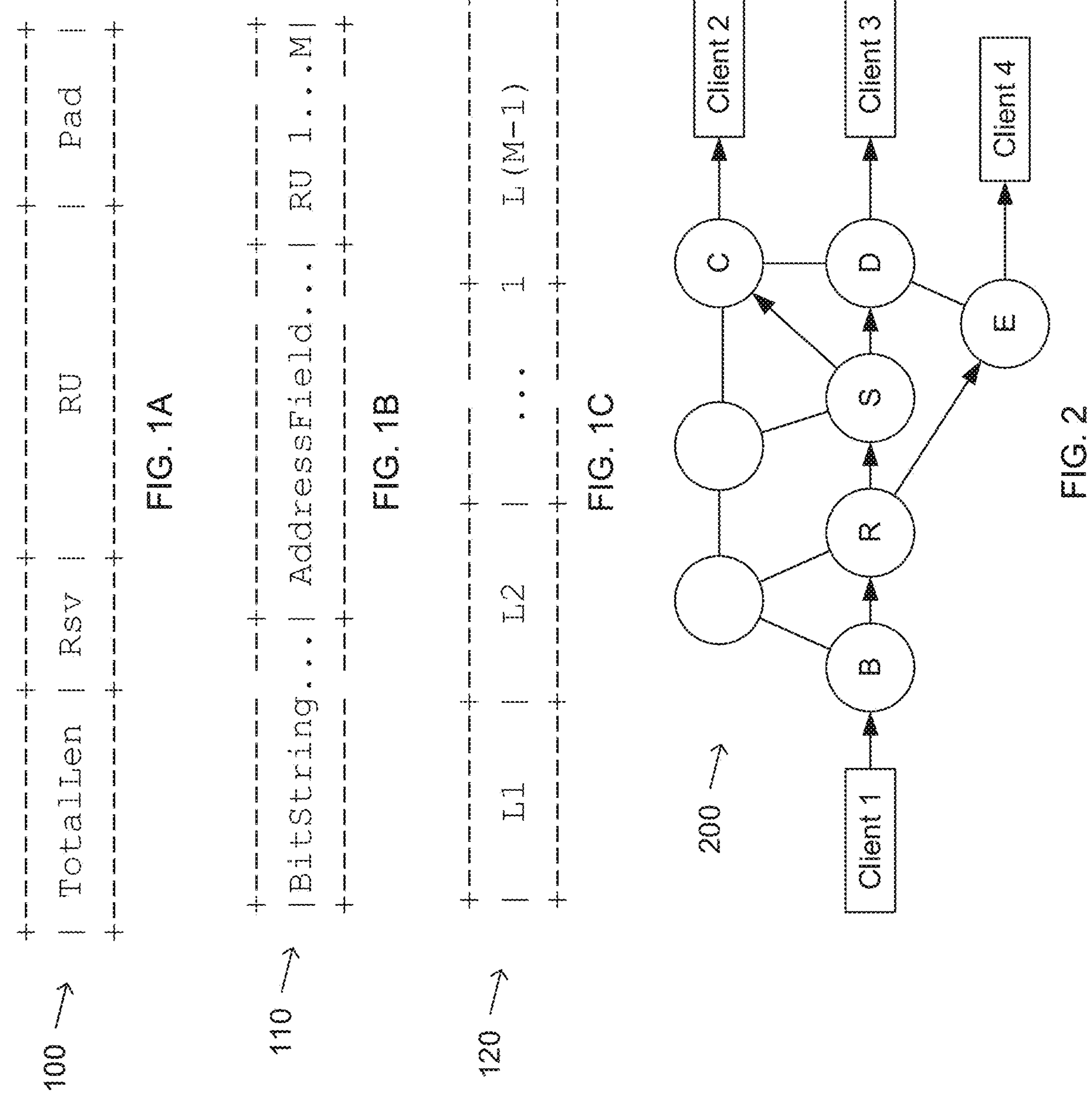
FIGS. 1A-1C are schematic diagrams of elements of a traffic-steering addressing mechanism using an RBS.
FIG. 2 is a block diagram of a sample communications network.

FIGS. 1A-1C are schematic diagrams of elements of a traffic-steering addressing mechanism using an RBS. FIG. 1A is a schematic diagram of fields of a structured address 100 (or addressing header) that is part of a packet received by a receiving network element. The structured address 100 includes a total length field (TotalLen), a reserved field (Rsv), a recursive unit field (RU), and a padding field (Pad). The total length field TotalLen comprises information relating to a length of a portion of the structured address 100 that excludes the lengths of the total length field TotalLen and the padding field Pad. The reserved field Rsv is an optional field that may include additional, non-recursive flags and/or fields used in interpreting the structured address 100. The recursive unit field RU is described in further detail with reference to FIG. 1B. The padding field Pad is used to align an end of the structured address 100 as required by a protocol used to encapsulate the structured address 100.

FIG. 1B is a schematic diagram of fields of a recursive unit field 110 (or RU) of the structured address 100. The RU 110 indicates to the receiving network element how it is to process the received packet. The RU 110 is an RBS structure that includes a bitstring field (BitString), an addressing field (AddressField), and one or more additional RUs (RUs 1 . . . . M). Each bit in the bitstring field (or forwarding bitstring field) corresponds to an adjacent network element to which the receiving network element is to forward the packet. As used herein, the term forwarding bitstring field (or bitstring field) means a field in which an explicit bitstring is used to address vertices of a graph or leaf nodes of a distribution tree and/or intermediate nodes.

The position of a bit in the bitstring field BitString corresponds to a position of an adjacent network element in a bitstring index forwarding table (BIFT) stored locally in the receiving network element. In some embodiments, a bit that is set is an indication that the packet is to be forwarded to the corresponding adjacent network element in the BIFT. The addressing field AddressField is described in further detail with reference to FIG. 1C. For each bit set in the bitstring field, the set bit corresponds to an adjacent bit forwarding router (BFR) or bit forwarding egress router (BFER), and the RU 110 includes an additional RU 1 . . . . M for use in a structured address 100 used when forwarding the packet to an indicated adjacent network element. For set bits in the bitstring field that correspond to a client node or other node where the packet is decapsulated before being sent, the RU 110 does not include an additional RU 1 . . . . M. Bits that are not set in the bitstring field correspond to client nodes, adjacent BFRs, and/or BFERs that are not on the packet's route through the network. The structure of each additional RU 1 . . . . M is the same as that of the RU 110.

FIG. 1C is a schematic diagram of length fields of an addressing field 120 of the RU 110. The addressing field 120 includes one or more length fields L1 . . . . L(M−1), where each length field Li is a length of an additional RU 1 . . . (M−1). A length of RUm is not explicitly encoded but may be calculated from the total length field and the length fields in the addressing field 120. Where the RU 110 includes only a single additional RU (i.e., M=1), the addressing field 120 of the RU 110 includes no length fields (M−1=0) and is empty. As such, the addressing field 120 is optional and some RUs include no addressing field 120.

FIG. 2 is a block diagram of a sample communications network 200. A packet from a Client 1, connected to a bit forwarding ingress router (BFIR) B, is intended to be replicated to Clients 2, 3, and 4. In this example, a controller determines that the packet should be forwarded hop-by-hop across the network 200 via a route shown in FIG. 2 by links with arrows. The BFIR B creates a header for the packet, including an RBS address to route the packet through the network 200 via the route determined by the controller: from BFIR B to BFR R, from BFR R to both BFR S and BFER E, from BFR S to BFER C and BFER D, and from BFERs C, D, and E to Clients 2, 3, and 4, respectively.

Figures 3A, 3B, 3C:
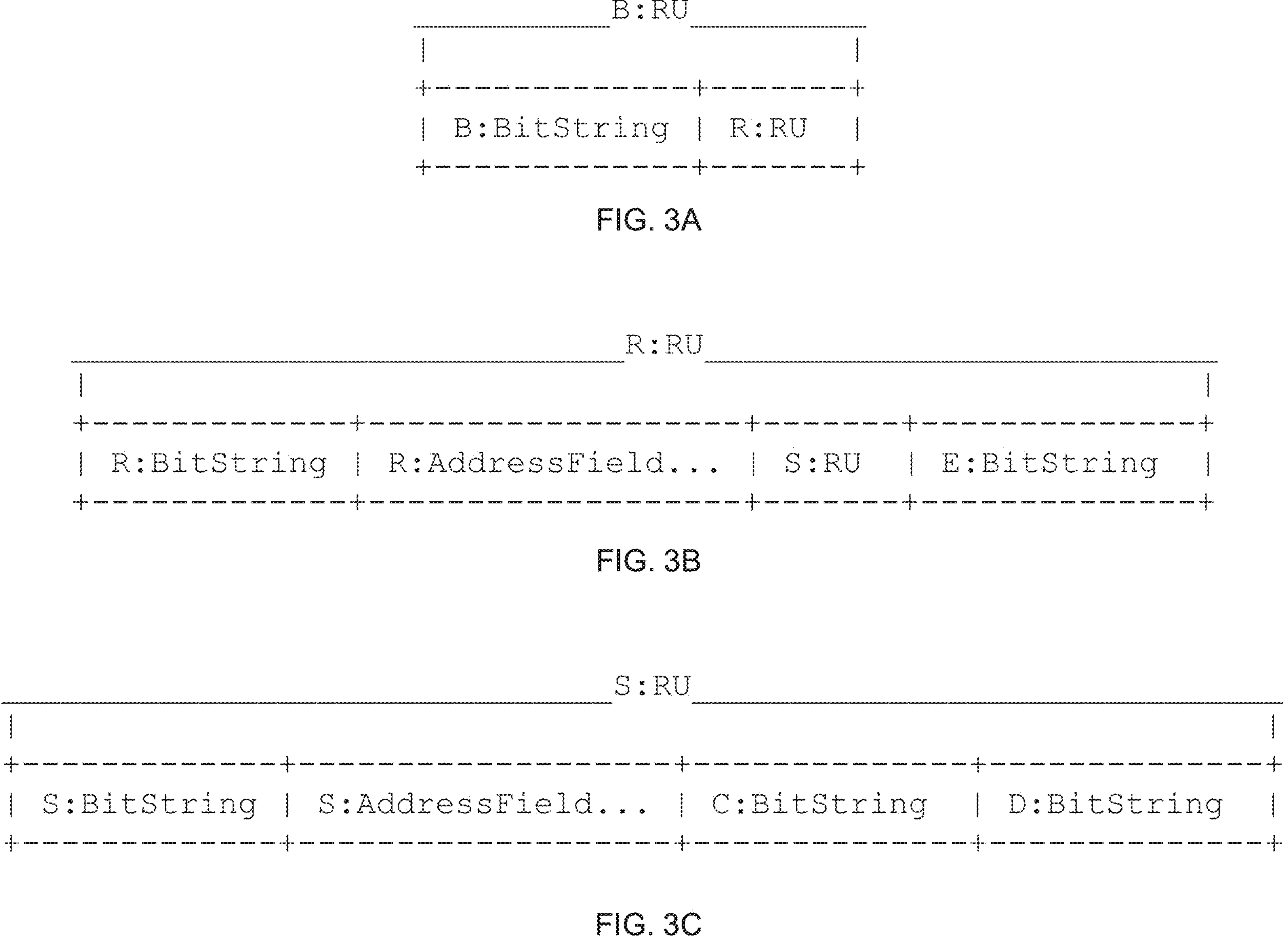
FIGS. 3A-3C are schematic diagrams of example recursive units (RUs) used in steering a packet via a route through the sample communications network of FIG. 2.

FIGS. 3A-3C are schematic diagrams of example recursive units (RUs) used while steering a packet via a route through the sample communications network 200 via the route determined by the controller. FIG. 3A is a schematic diagram of an RU (B:RU) that indicates to the BFIR B how it is to process its received packet. The RU B:RU includes a bitstring field (B:BitString) and one RU (R:RU). The bitstring field B:BitString (which has value 01) includes a bit indicating that the BFIR B is to forward the packet to the BFR R. As described above, bits in B:BitString correspond to positions of adjacent network elements in the BIFT of the BFIR B. In the network 200, the BFIR B is adjacent to an unlabeled BFR and the BFR R. The B:BitString value 01 indicates that the BFIR B is not to forward the packet to the unlabeled BFR and is to forward the packet to the BFR R. The packet forwarded to the BFR R includes the RU R:RU. Because the RU B:RU includes only a single additional RU (R:RU), the RU B:RU includes no addressing field.

FIG. 3B is a schematic diagram of the RU R:RU that indicates to the BFR R how it is to process its received packet. The bitstring field R:BitString includes bits indicating that the BFR R is to forward the packet to the BFR S and the BFER E. The RU R:RU includes an addressing field (R:AddressField) having a single length field indicating the length of the RU S:RU. The RU R:RU further includes the RU S:RU and E:BitString. Network element E is a BFER and does not forward the packet, but rather decapsulates the packet and delivers it to Client 4, as indicated in E:BitString. As such, E:BitString includes no associated AddressField.

FIG. 3C is a schematic diagram of the RU S:RU that indicates to the BFR S how it is to process its received packet. The bitstring field S:BitString includes bits indicating that the BFR S is to forward the packet to the BFER C and the BFER D. The RU S:RU includes an addressing field (S:AddressField) having a single length field indicating the length of the bit string C:BitString. The RU S:RU further includes the bit string C:BitString and bit string D:BitString. Both network elements C and D are BFERs and do not forward the packet, but rather deliver the packet to Clients 2 and 3, respectively, as indicated in C:BitString and D:BitString, respectively.

Figures 4, 5, 6, 7:
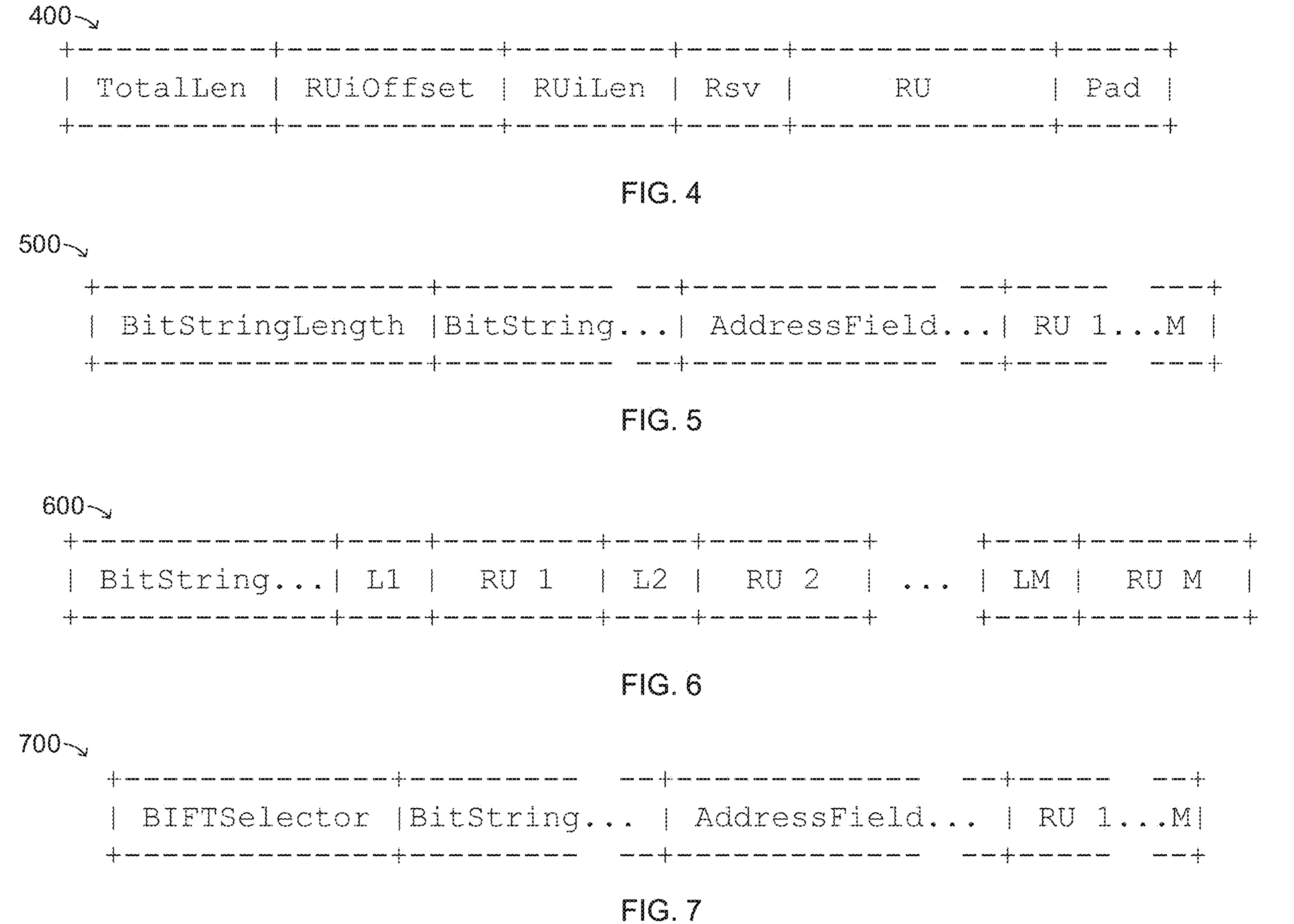
FIG. 4 is a schematic diagram of a structured address according to an embodiment of the disclosure.
FIG. 5 is a schematic diagram of a first RU according to an embodiment of the disclosure.
FIG. 6 is a schematic diagram of a second RU according to an embodiment of the disclosure.
FIG. 7 is a schematic diagram of a third RU according to an embodiment of the disclosure.

FIG. 4 is a schematic diagram of a structured address 400 according to an embodiment of the disclosure. A problem with packets using the structured address 100 of FIG. 1A is that a complex process is required to prepare a forwarding packet with a revised structured address for a next network element in the route of the packet. In a first step, the part of the received packet before the structured address 100 is copied (with any suitable changes to the TotalLen field) to the forwarding packet. In a second step, the RU of the network element that will receive the forwarding packet is copied into the recursive unit RU field of the structured address 100 of the forwarding packet. In a third step, the part of the received packet that follows the structured address 100 is copied into the forwarding packet, with the padding filed Pad modified to align the end of the structured address 100 as required by the encapsulation protocol being used. This process must be performed separately for each network element to which the received packet is to be forwarded. The process may be referred to as a Scatter-Gather forwarding process or a Vector I/O forwarding process.

The structured address 400 includes two new fields in addition to the fields of the structured address 100 of FIG. 1A. The two fields are a Recursive Unit(i) Offset (RUiOffset) field and a Recursive Unit(i) Length (RUiLen) field. Collectively, RUiOffset and RUiLen may be referred to as RU locating fields. The total length field TotalLen need not be increased by the size of these two fields, as calculations on packets comprising the structured address 100 start after the reserved field Rsv.

The RU locating fields identify which RU (or forwarding RU) within the recursive unit field RU the receiving network element is to use in processing the received packet. When the packet is received by the first network element in the route of the packet, RUiOffset is set to 0, and RUiLen is set to TotalLen, indicating that the first network element is to use the full recursive unit field RU.

In contrast to the complex process described above for preparing a forwarding packet with a revised structured address 100, forwarding a received packet comprising the structured address 400 requires only two steps. The entire received packet is copied into the forwarding packet and the fields RUiOffset and RUiLen in the forwarding packet are overwritten with new values that identify the forwarding RU within the recursive unit field RU to be used by the network element to which the packet is being forwarded, i.e., the next network element in the route of the packet.

Use of the structured address 400 has the benefit of reducing complexity and processing time for any network element in forwarding a packet. A further benefit is to allow network elements having less powerful processors—such as application-specific integrated circuits (ASICs)—to forward packets comprising the structured address 400.

In some embodiments, a network element performs only as a forwarding router, receiving a packet including the structured address 400, determining from a forwarding bitstring field an adjacent network element to which to forward the packet, creating a forwarding packet, overwriting the RU locating fields in the forwarding packet with new values that identify the forwarding RU of the adjacent network element, and forwarding (or sending) the forwarding packet to the adjacent network element. In other embodiments, a network element performs only as an initiating (or ingress) network element, sending a packet including the structured address 400 with RU locating field values in the packet that identify an RU for use by the adjacent network element in forwarding the packet. In still other embodiments, a network element is configured to perform as both a forwarding router and an initiating network element.

FIG. 5 is a schematic diagram of a first RU 500 according to an embodiment of the disclosure. When a BFR receives a packet with the structured address 100 or 400, the receiving BFR expects that the BitString field of the RU 110 is of the same size as its local BIFT. Such a BitString field may be referred to as a supported bitstring field. If the structured address was misconstructed and/or misrouted and the receiving BFR is not an intended BFR, then parsing of the structured address 100 or 400 will likely fail because the receiving BFR will skip over an incorrect number of BitString bits to begin interpreting an addressing field AddressField or additional RU.

The RU 500 includes an additional field to the fields of the RU 110 of FIG. 1B. A field (BitStringLength) comprises a length of the BitString field of the RU 500 and located in the RU 500 before the BitString field. The length of the field BitStringLength may be a predetermined value that is known by all network elements of the network.

When a network element parses a received packet comprising a structured address that includes the RU 500, the parsing process comprises determining whether there is an error in the received packet by comparing a value of the BitStringLength field with a length of a supported BitString field (i.e., a local BIFT size of the network element). If the value of BitStringLength is different than the size of the network element's local BIFT, then the network element ceases a forwarding process of the received packet and may raise an error condition.

In some embodiments, where a source/return address is included in the received packet, the network element may return an error indication to a sender of the received packet. In other embodiments, the network element may raise an error condition via a message on a management plane system. In some such embodiments, a packet forwarding protocol such as multi-protocol label switching (MPLS) may be used, where there is no source/return address.

In still other embodiments, alternative or additional fields having a fixed length may comprise a length of the BitString field of the RU 500. Such fields may optionally include other information related to the received packet. In such embodiments, the network element may be configured to compare information in such alternative or additional fields with information in the received packet to detect an incorrect structured address.

Some packet encapsulation protocols include a field called BitStringLength (BSL) to allow offline tools (such as Local Area Network (LAN) analyzers) to parse a BIER header. However, such protocols mandate that a BFR must infer a length of the BitString field of the RU 500 from a BIFT-id field of the packet header and not infer the length of the BitString field of the RU 500 from the BSL field of such protocols.

Use of the BitStringLength field of the RU 500 has the benefit of allowing a received packet that has been misconstructed or misrouted to be recognized by a receiving network device before the network device attempts to parse the received packet using incorrect assumptions about a structure of the packet. A further benefit is to allow the receiving network device to signal to a sender of the received packet or to a management plane network element of the network that such a misconstructed or misrouted packet has been encountered. A further benefit is to reduce or eliminate propagation of such misconstructed or misrouted packets through the network.

In some embodiments, a network element performs only as a forwarding router, receiving a packet including a structured address that includes the RU 500, determining whether there is an error in the received packet by comparing a value of the BitStringLength field with a local BIFT size of the network element, and forwarding the packet according to the bitstring field in the current recursive unit only if there is determined to be no error. In other embodiments, a network element performs only as an initiating (or ingress) network element, sending a packet including a structured address that includes the RU 500. In still other embodiments, a network element is configured to perform as both a forwarding router and an initiating network element. The embodiment described with reference to FIG. 5 is compatible with and may be combined with the embodiment described with reference to FIG. 4.

FIG. 6 is a schematic diagram of a second RU 600 according to an embodiment of the disclosure. Before a receiving network device can forward a received packet that uses the RU 110, a location of a desired RU(m) within the additional RUs 1 . . . . M must be determined in order to use the desired RU(m) in forwarding the received packet. Both the addressing field 120 and the additional RUs 1 . . . . M of the RU 110 are variable-size fields. As such, the receiving network element must first determine a number of addresses in the addressing field 120 in order to determine a length of the addressing field 120. Once the length of the addressing field 120 is known, the location of the beginning of the additional RUs 1 . . . . M in the RU 110 may be determined. The network element may determine the length of the addressing field 120 by counting the number of set bits in the bitstring field BitString, which indicates the number of additional RUs 1 . . . . M in the RU 110 and, by subtracting 1, the number of entries in the addressing field 120. To determine the location of the desired RU(m), the network element adds the values of the entries L1 . . . . L(m−1) and offsets by that sum from the beginning of the additional RUs 1 . . . . M in the RU 110.

The second RU 600 comprises one or more pairs of length field L(i) and additional RU(i), instead of the separate addressing field 120 and additional RUs 1 . . . . M of the RU 110 of FIG. 1B. Each length field L(i) indicates a length of an associated additional RU(i). As shown, the length field can optionally be adjacent to its associated RU in the packet. When using the second RU 600 to find, for example an RU(3) associated with the third set bit in the bitstring field BitString, the process performed by the network element is to read the value of L(1), advance by the combined lengths of L(1) and RU(1) to the beginning of L(2), read the value of L(2), advance by the combined lengths of L(2) and RU(2) to the beginning of L(3), read the value of L(3), and use the RU(3) in the forwarding packet.

The process described above for determining a location of a desired RU(m) within the additional RUs 1 . . . . M of the RU 110 has several problems. Whatever the value of m, determining the location of RU(m) incurs a processing latency that is proportional to M, the total number of additional RUs 1 . . . . M in the RU 110. Where a large number of additional RUs 1 . . . . M are present in the RU 110, the total value of the entries L1 . . . . L(m−1) may exceed a word size of a processor performing the process described above. As such, use of the process described above may set a lower limit on the type or size of processor that may be used in a network element that is capable of forwarding packets comprising structured addresses that include the RU 110.

In contrast, the processing latency incurred in determining the location of any RU(m) in the second RU 600 is proportional to m, not to M, thus reducing total processing latency across the network. As each step in the process of determining the location of a desired RU(m) in the second RU 600 requires advancing over only a single additional RU, the process may be performed by processors having a smaller word size than required for the process of determining a location of a desired RU(m) within the additional RUs 1 . . . . M of the RU 110, even for packets being forwarded to a large number of other network elements. Furthermore, the process of determining the location of a desired RU(m) in the second RU 600 may be performed by less powerful processors, such as field programmable gate arrays (FPGAs) and ASICs.

In some embodiments, a network element performs only as a forwarding router, receiving a packet including a structured address that includes the RU 600, accessing an RU of a next network element in the route of the packet using one or more of the length fields L1 . . . L(M), and forwarding the packet to the next network element. In other embodiments, a network element performs only as an initiating (or ingress) network element, sending a packet including a structured address that includes the RU 600. In still other embodiments, a network element is configured to perform as both a forwarding router and an initiating network element. The embodiment described with reference to FIG. 6 is compatible with and may be combined with either or both of the embodiments described with reference to FIG. 4 and FIG. 5.

FIG. 7 is a schematic diagram of a third RU 700 according to an embodiment of the disclosure. The structured address 100 and the RU 110 are specified based on an assumption that a router has only a single BIFT, and the length of the bitstring field (BitString) is set equal to the length of the router BIFT. In some applications, a router on the edge of a network may have many interfaces/neighbors, resulting in a long BIFT (e.g., one BIFT entry per neighbor/interface). However, in such applications, some packets sent to such an edge router may need to be forwarded to only a frequently-used subset of the many interfaces/neighbors. In one example, a "hub" router in a ring may have 2 interfaces to other routers in the ring, as well as for interfaces to a larger number (e.g., 50) "spoke" routers connecting to the "hub" router. A single BIFT for such a "hub" router may be inefficient because some packets received by the "hub" router will be forwarded only along the ring (e.g., "clockwise" or "counterclockwise" along the ring), some received packets will be forwarded only to a frequently-used subset of the spoke routers, and still other packets will be forwarded to many or all of the "spoke" routers.

The third RU 700 includes a field BIFTSelector in addition to the fields of the RU 110 of FIG. 1B. A value of the field BIFTSelector indicates a BIFT of a network element that receives the third RU 700, where the field BitString is interpreted as identifying network elements in the indicated BIFT to which a received packet is to be forwarded. The value in the field BIFTSelector may be encoded using a bit-by-bit, variable length encoding. In some embodiments, for example, the bit sequence '0' (or '00') identifies a first BIFT, the bit-sequence '10' identifies a second BIFT, and the value '11' identifies a third BIFT. Each of the first, second, and third BIFTs may have a different length. The length of the BIFT is independent of the value of the field BIFTSelector.

Returning to the "hub" router example described above, such a router might have two BIFTs. A first BIFT includes identifies three interfaces/neighbors: a first entry for the router from which the packet is received, and two other entries, one for each of the other two routers in the ring. A second BIFT includes those three entries, as well as entries for the 50 "spoke" routers. Such a "hub" router could use a single bit value for the field BIFTSelector—e.g., a value '0' to indicate the first BIFT and a value '1' to indicate that the second BIFT is to be used, Thus, if the received packet includes a value '0' in the field BIFTSelector, the network element will expect a three-bit value in the field BitString, specifying which entries in the first BIFT identify network elements to which a received packet is to be forwarded. If the received packet includes a value '1' in the field BIFTSelector, the network element will expect a fifty-three-bit value in the field BitString, specifying which entries in the second BIFT identify network elements to which a received packet is to be forwarded.

In contrast to the structured address 100 and the RU 110, which assumes that the network element has only a single, fifty-three entry BIFT and always includes a fifty-three-bit value in the field BitString, the third RU 700 provides the ability to use a BIFT and BitString of smaller size when it is known that some packets sent to a router will be forwarded to fewer than all the interfaces/neighbors coupled to the router. Thus, the use of a plurality of BIFTs and the field BIFTSelector allows packets being sent to fewer than all the network elements coupled to the router to be sent in a shorter packet, reducing network bandwidth requirements.

In some embodiments, a network element performs only as a forwarding router, receiving a packet including a structured address that includes the RU 700, interpreting the field BitString according to a BIFT indicated by the field BIFTSelector, and forwarding the packet to an adjacent network element. In other embodiments, a network element performs only as an initiating (or ingress) network element, sending a packet including a structured address that includes the RU 700. In still other embodiments, a network element is configured to perform as both a forwarding router and an initiating network element. The embodiment described with reference to FIG. 7 is compatible with and may be combined with any or all of the embodiments described with reference to FIG. 4, FIG. 5, and FIG. 6.

FIGS. 8A-8E are schematic diagrams of structured addresses 800 and 810 and RUs 820, 830, and 840 according to embodiments of the disclosure. Structured addresses 100 and 400, as well as structured addresses that include RUs 500, 600, and 700, enable a packet to be directed and replicated to one or more network elements. However, such structured addresses and RUs do not include a field to indicate to network elements a destination address for the packet, e.g., an IP Multicast group address, IPv6 Segment Identifier (SID), or other suitable address. In some protocols, a packet header that includes the structured address 100 is combined with a second packet header that includes a desired destination address for use by network elements that receive the packet.

Figures 8A, 8B:
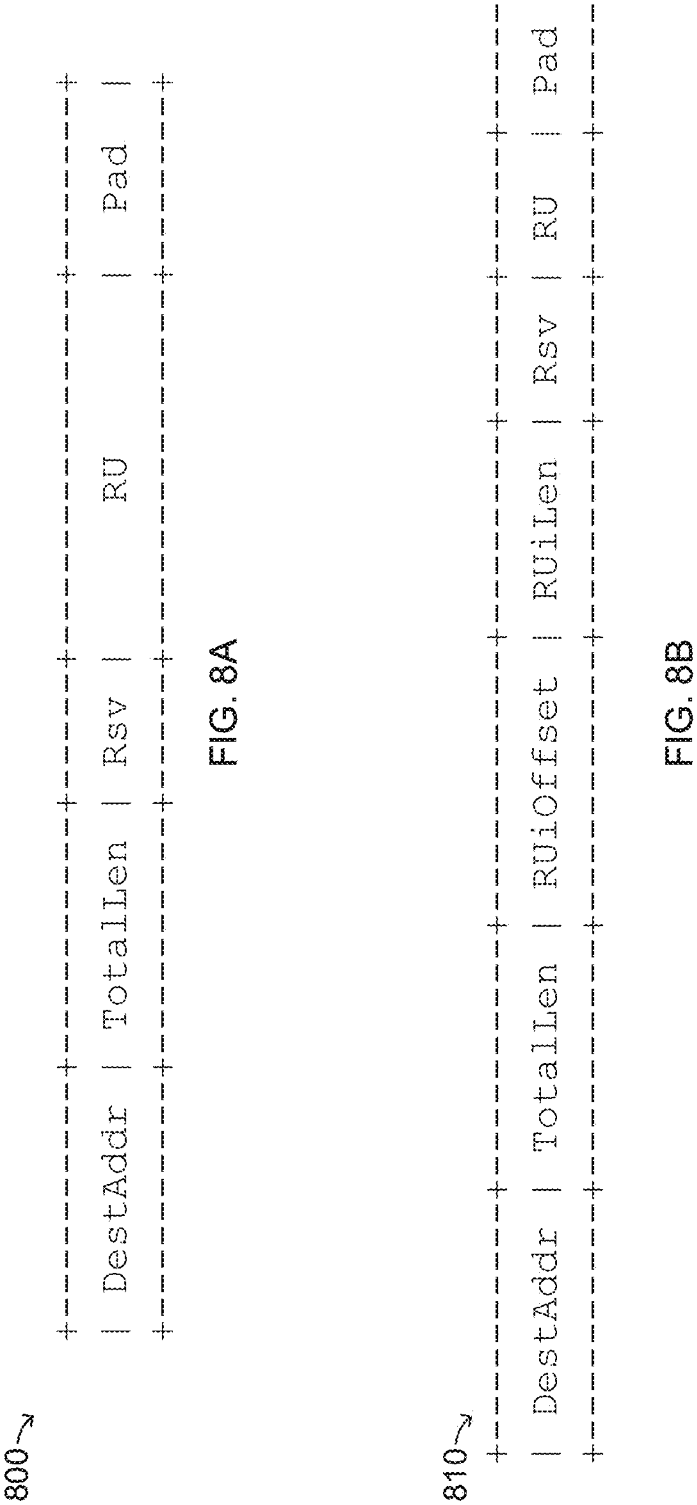

The structured address 800 of FIG. 8A comprises a destination address field DestAddr and the structured address 100. The structured address 810 of FIG. 8B comprises a destination address field DestAddr and the structured address 400. The RU 820 of FIG. 8C comprises a destination address field DestAddr and the RU 500. The RU 830 of FIG. 8D comprises a destination address field DestAddr and the RU 600. The RU 840 of FIG. 8E comprises a destination address field DestAddr and the RU 700.

There are two cases in which a packet comprising a structured address including an RBS further includes an indication that the packet is to be received by a network element. In a first case, the packet is replicated by a network element according to a bit in the field BitString which indicates that the network element should receive the packet (optionally, in addition to forwarding the packet). In a second case, the packet is received comprising a zero-length RU, indicating that the network element should receive the packet. In both cases, the network element extracts the destination address field DestAddr from the structured address or RU of the received packet and uses it as the destination address of the packet in determining how to further process the packet. In one example, if the destination address is an IP Multicast Group address, then the network element determines an application on the processing system to which to send the packet.

FIGS. 9A-9B are first and second multicast methods (900 and 910, respectively) performed by a network element (e.g., network element 1300) configured to receive and send packets comprising a payload and an addressing header with an RBS structure. The method 900 may be performed by the network element to forward such a packet. The method 910 may be performed by the network element to originate such a packet.

In block 902, the network element receives a packet, where the packet comprises a payload and an addressing header with an RBS structure. The RBS structure includes a forwarding bitstring field configured to indicate one or more other network elements to which to forward the payload, and one or more additional RUs comprising a forwarding bitstring field indicating how the one or more other network elements should forward the payload. The RBS structure further includes one or more RU locating fields, which indicate a location within the RU of the network element and the one or more additional RUs.

In block 904, the network element forwards the packet according to the forwarding bitstring field of the RU of the network element, the forwarded packet comprising rewritten RU locating fields indicating a location within the RU of an RU of a subsequent network element.

In the method 910, the network element sends a packet, where the packet comprises a payload and an addressing header with an RBS structure. The RBS structure includes a forwarding bitstring field configured to indicate one or more other network elements to which to forward the payload, and one or more additional RUs each comprising a forwarding bitstring field indicating how the one or more other network elements should forward the payload. The RBS structure further includes one or more RU locating fields, which indicate a location within the RU of the network element and the one or more additional RUs.

In an embodiment, the recursive unit locating fields comprise a recursive unit length field. In an embodiment, the forwarded packet comprises all of the recursive units included in the received packet.

FIGS. 10A-10B are third and fourth multicast methods (1000 and 1010, respectively) performed by a network element (e.g., network element 1300) configured to receive and send packets comprising a payload and an addressing header with an RBS structure. The method 1000 may be performed by the network element to forward such a packet. The method 1010 may be performed by the network element to originate such a packet.

In block 1002, the network element receives a packet, where the packet comprises a payload and an addressing header with an RBS structure. The RBS structure includes an RU bitstring length field indicating a length of a forwarding bitstring field configured to indicate one or more other network elements to which to forward the payload, and one or more additional RUs each comprising bitstring length fields and forwarding bitstring fields indicating how the one or more other network elements should forward the payload.

In block 1004, the network element compares the length indicated by the RU bitstring length field with a length of a supported bitstring field of the network element to determine whether there is an error. In block 1006, the network element forwards the packet according to the forwarding bitstring field of the RU only if there is determined to be no error.

In an embodiment, the length of the network element's supported bitstring fields corresponds to a size of a bitstring index forwarding table (BIFT) of the network element. In an embodiment, the network element sends an error message toward a source of the packet if there is determined to be an error.

In the method 1010, the network element sends a packet, where the packet comprises a payload and an addressing header with an RBS structure. The RBS structure includes an RU bitstring length field indicating a length of a forwarding bitstring field configured to indicate one or more other network elements to which to forward the payload, and one or more additional RUs each comprising bitstring length fields and forwarding bitstring fields indicating how the one or more other network elements should forward the payload.

FIGS. 11A-11B are fifth and sixth multicast methods (1100 and 1110, respectively) performed by a network element (e.g., network element 1300) configured to receive and send packets comprising a payload and an addressing header with an RBS structure. The method 1100 may be performed by the network element to forward such a packet. The method 1110 may be performed by the network element to originate such a packet.

In block 1102, the network element receives a packet, where the packet comprises a payload and an addressing header with an RBS structure. The RBS structure includes a forwarding bitstring field configured to indicate one or more other network elements to which to forward the payload, and one or more pairs of length field and additional RU, where the length field in each pair indicates a length of the associated RU in the pair.

In block 1104, the network element determines a recursive unit to be processed using at least one of the pairs of length field and additional RU. In block 1106, the network element forwards the packet according to the forwarding bitstring field in the RU of the network element.

In the method 1110, the network element sends a packet, where the packet comprises a payload and an addressing header with an RBS structure. The RBS structure includes a forwarding bitstring field configured to indicate one or more other network elements to which to forward the payload, and one or more pairs of length field and additional RU, where the length field in each pair indicates a length of the associated RU in the pair.

In an embodiment, the packet comprises a length field corresponding to each additional RU.

Figures 12A, 12B:
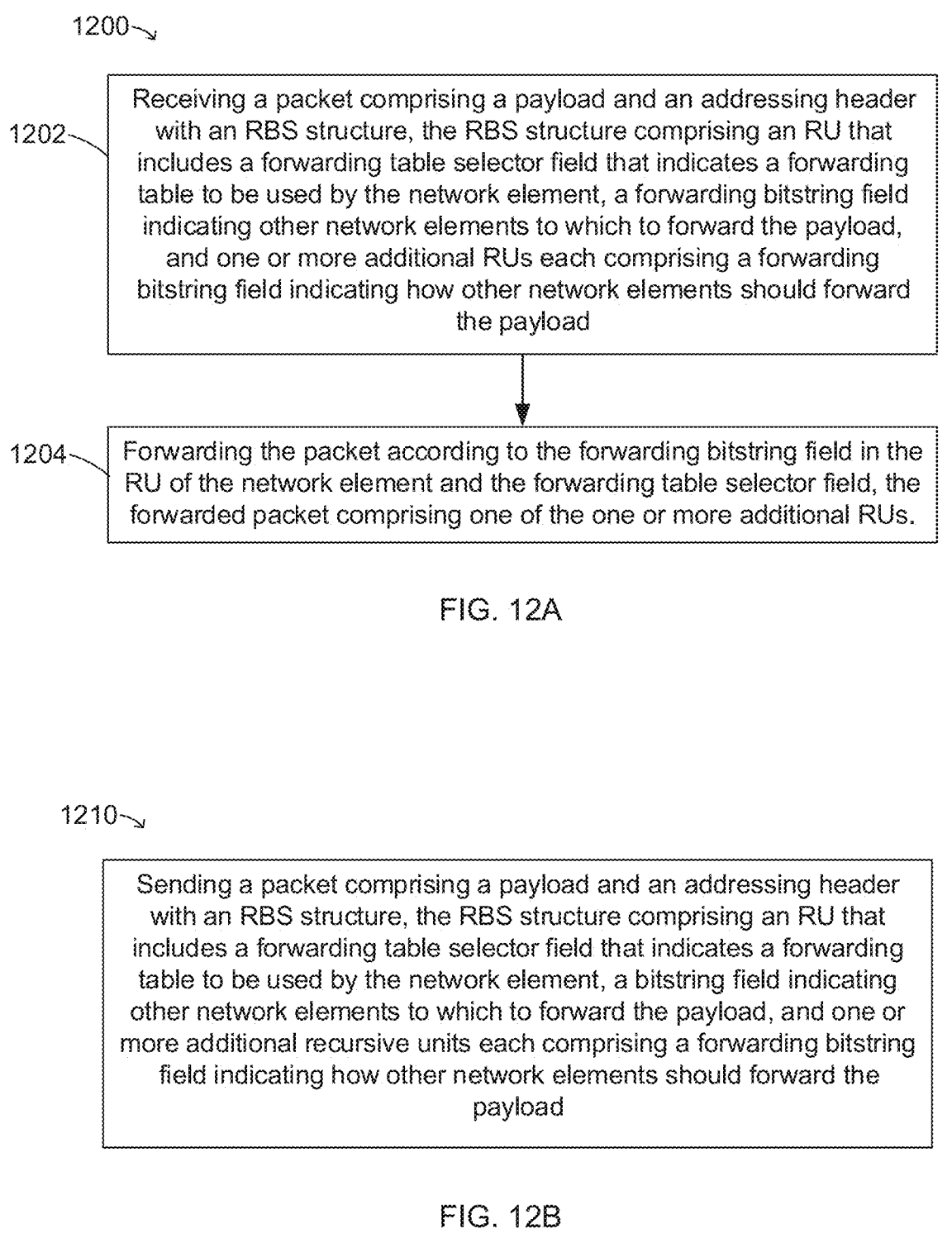

FIGS. 12A-12B are seventh and eighth multicast methods (1200 and 1210, respectively) performed by a network element (e.g., network element 1300) configured to receive and send packets comprising a payload and an addressing header with an RBS structure. The method 1200 may be performed by the network element to forward such a packet. The method 1210 may be performed by the network element to originate such a packet.

In block 1202, the network element receives a packet, where the packet comprises a payload and an addressing header with an RBS structure. The RBS structure includes an RU comprising a forwarding table selector field that indicates a forwarding table to be used by the network element, a forwarding bitstring field indicating other network elements to which to forward the payload, and one or more additional RUs each comprising a forwarding bitstring field indicating how other network elements should forward the payload.

In block 1204, the network element forwards the packet according to the forwarding bitstring field in the RU of the network element and the forwarding table selector field, the forwarded packet comprising one of the one or more additional RUs.

In the method 1210, the network element sends a packet, where the packet comprises a payload and an addressing header with an RBS structure. The RBS structure includes an RU comprising a forwarding table selector field that indicates a forwarding table to be used by a receiving network element, a forwarding bitstring field indicating other network elements to which to forward the payload, and one or more additional RUs each comprising a forwarding bitstring field indicating how other network elements should forward the payload.

In an embodiment, the forwarding table selector field is encoded using only the values 0, 10, and 11.

In an embodiment, the forwarding bitstring field comprises a bitstring configured to address one of (i) vertices of a graph and (ii) leaf nodes and/or intermediate nodes of a distribution tree. In an embodiment, the RBS structure further comprises a non-bitstring destination address.

FIG. 13 is a schematic diagram of a network element 1300 (e.g., a network controller, a network node, etc.). The network element 1300 is suitable for implementing the disclosed embodiments as described herein. The network element 1300 comprises ingress ports/ingress means 1310 (a.k.a., upstream ports) and receiver units (Rx)/receiving means 1320 for receiving data; a processor, logic unit, or central processing unit (CPU)/processing means 1330 to process the data; transmitter units (Tx)/transmitting means 1340 and egress ports/egress means 1350 (a.k.a., downstream ports) for transmitting the data; and a memory/memory means 1360 for storing the data. The network element 1300 may also comprise optical-to-electrical (OE) components and electrical-to-optical (EO) components coupled to the ingress ports/ingress means 1310, the receiver units/receiving means 1320, the transmitter units/transmitting means 1340, and the egress ports/egress means 1350 for egress or ingress of optical or electrical signals.

The processor/processing means 1330 is implemented by hardware and software. The processor/processing means 1330 may be implemented as one or more central processing unit (CPU) chips, cores (e.g., as a multi-core processor), field-programmable gate arrays (FPGAs), application specific integrated circuits (ASICs), and digital signal processors (DSPs). The processor/processing means 1330 is in communication with the ingress ports/ingress means 1310, receiver units/receiving means 1320, transmitter units/transmitting means 1340, egress ports/egress means 1350, and memory/memory means 1360. The processor/processing means 1330 comprises an RBS address module 1370. The RBS address module 1370 is able to implement the methods disclosed herein. The inclusion of the RBS address module 1370 therefore provides a substantial improvement to the functionality of the network element 1300 and effects a transformation of the network element 1300 to a different state. Alternatively, the RBS address module 1370 is implemented as instructions stored in the memory/memory means 1360 and executed by the processor/processing means 1330.

The network element 1300 may also include input and/or output (I/O) devices or I/O means 1380 for communicating data to and from a user. The I/O devices or I/O means 1380 may include output devices such as a display for displaying video data, speakers for outputting audio data, etc. The I/O devices or I/O means 1380 may also include input devices, such as a keyboard, mouse, trackball, etc., and/or corresponding interfaces for interacting with such output devices.

The memory/memory means 1360 comprises one or more disks, tape drives, and solid-state drives and may be used as an over-flow data storage device, to store programs when such programs are selected for execution, and to store instructions and data that are read during program execution. The memory/memory means 1360 may be volatile and/or non-volatile and may be read-only memory (ROM), random access memory (RAM), ternary content-addressable memory (TCAM), and/or static random-access memory (SRAM).

The disclosed embodiments may be a system, an apparatus, a method, and/or a computer program product at any possible technical detail level of integration. The computer program product may include a computer readable storage medium (or media) having computer readable program instructions thereon for causing a processor to carry out aspects of the present disclosure. The computer readable storage medium may be a tangible device that can retain and store instructions for use by an instruction execution device.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other examples of changes, substitutions, and alterations are ascertainable by one skilled in the art and may be made without departing from the spirit and scope disclosed herein.

What is claimed is:

1. A multicast method performed by a network element, the method comprising:

receiving a packet, the packet comprising a payload and an addressing header with a recursive bitstring (RBS) structure, the RBS structure comprising:

a recursive unit (RU) of the network element, the RU comprising a forwarding bitstring field configured to indicate one or more other network elements to which to forward the payload, and one or more additional RUs, each additional RU of the one or more additional RUs comprising a forwarding bitstring field indicating how the one or more other network elements should forward the payload; and one or more RU locating fields, the one or more RU locating fields indicating a location within the RU of the network element and the one or more additional RUs; and forwarding the packet according to the forwarding bitstring field in the RU of the network element, the forwarded packet comprising rewritten RU locating fields indicating a location within the RU of an RU of a subsequent network element.

2. The multicast method of claim 1, wherein a RU bitstring length field indicates a length of the forwarding bitstring field.

3. The multicast method of claim 1, wherein the one or more additional RUs each comprise bitstring length fields and forwarding bitstring fields indicating how the one or more other network elements should forward the payload.

4. The multicast method of claim 1, wherein a RU bitstring length field indicates a length of the forwarding bitstring field, the method further comprising:

comparing the length indicated by the RU bitstring length field with a length of a supported bitstring field of the network element to determine whether an error has occurred; and forwarding the packet according to the forwarding bitstring field of the RU only if no error is determined.

5. The multicast method of claim 1, wherein the forwarding bitstring field comprises one or more pairs of length fields and an additional RU.

6. The multicast method of claim 1, wherein the forwarding bitstring field comprises one or more pairs of length fields and an additional RU, the length field in each pair indicates a length of the additional RU in the pair.

7. The multicast method of claim 1, wherein the forwarding bitstring field comprises one or more pairs of length fields and an additional RU, and the length field in each pair indicates a length of the additional RU in the pair, the method further comprising:

determining an additional RU to be processed using at least one of the pairs of length fields and the additional RU; and forwarding the packet according to the forwarding bitstring field in the RU of the network element.

8. The multicast method of claim 1, wherein the RU further comprises a forwarding table selector field indicating a forwarding table to be used by the network element.

9. The multicast method of claim 1, wherein the RU further comprises a forwarding table selector field indicating a forwarding table to be used by the network element, the method further comprising:

forwarding the packet according to the forwarding bitstring field in the RU of the network element and the forwarding table selector field, the forwarded packet comprising one of the one or more additional RUs.

10. A network element, comprising:

a memory storing instructions; and at least one processor in communication with the memory, the at least one processor configured, upon execution of the instructions, to perform the following steps:

receive a packet, the packet comprising a payload and an addressing header with a recursive bitstring (RBS) structure, the RBS structure comprising:

a recursive unit (RU) of the network element, the RU comprising a forwarding bitstring field configured to indicate one or more other network elements to which to forward the payload, and one or more additional RUs, each additional RU of the one or more additional RUs comprising a forwarding bitstring field indicating how the one or more other network elements should forward the payload; and one or more RU locating fields, the one or more RU locating fields indicating a location within the RU of the network element and the one or more additional RUs; and forward the packet according to the forwarding bitstring field in the RU of the network element, the forwarded packet comprising rewritten RU locating fields indicating a location within the RU of an RU of a subsequent network element.

11. The network element of claim 10, wherein a RU bitstring length field indicates a length of the forwarding bitstring field.

12. The network element of claim 10, wherein the one or more additional RUs each comprise bitstring length fields and forwarding bitstring fields indicating how the one or more other network elements should forward the payload.

13. The network element of claim 10, wherein a RU bitstring length field indicates a length of the forwarding bitstring field, the at least one processor further executing the instructions to perform the steps of:

comparing the length indicated by the RU bitstring length field with a length of a supported bitstring field of the network element to determine whether an error has occurred; and forwarding the packet according to the forwarding bitstring field of the RU only if no error is determined.

14. The network element of claim 10, wherein the forwarding bitstring field comprises one or more pairs of length fields and an additional RU.

15. The network element of claim 10, wherein the forwarding bitstring field comprises one or more pairs of length fields and an additional RU, the length field in each pair indicates a length of the additional RU in the pair.

16. The network element of claim 10, wherein the forwarding bitstring field comprises one or more pairs of length fields and an additional RU, and the length field in each pair indicates a length of the additional RU in the pair, the at least one processor further executing the instructions to perform the steps of:

determining an additional RU to be processed using at least one of the pairs of length fields and the additional RU; and forwarding the packet according to the forwarding bitstring field in the RU of the network element.

17. The network element of claim 10, wherein the RU further comprises a forwarding table selector field indicating a forwarding table to be used by the network element.

18. The network element of claim 10, wherein the RU further comprises a forwarding table selector field indicating a forwarding table to be used by the network element, the at least one processor further executing the instructions to perform the steps of:

forwarding the packet according to the forwarding bitstring field in the RU of the network element and the forwarding table selector field, the forwarded packet comprising one of the one or more additional RUs.

19. A non-transitory computer-readable media storing computer instructions that configure at least one processor, upon execution of the instructions, to perform the following steps:

receive a packet, the packet comprising a payload and an addressing header with a recursive bitstring (RBS) structure, the RBS structure comprising:

a recursive unit (RU) of a network element, the RU comprising a forwarding bitstring field configured to indicate one or more other network elements to which to forward the payload, and one or more additional RUs, each additional RU of the one or more additional RUs comprising a forwarding bitstring field indicating how the one or more other network elements should forward the payload; and one or more RU locating fields, the one or more RU locating fields indicating a location within the RU of the network element and the one or more additional RUs; and forward the packet according to the forwarding bitstring field in the RU of the network element, the forwarded packet comprising rewritten RU locating fields indicating a location within the RU of an RU of a subsequent network element.

* * * * *